Aug. 28, 1951 C. P. F. RATERMANN 2,565,521
CLEANING APPARATUS FOR POULTRY LAYING BATTERIES
Filed Nov. 18, 1949 2 Sheets-Sheet 1
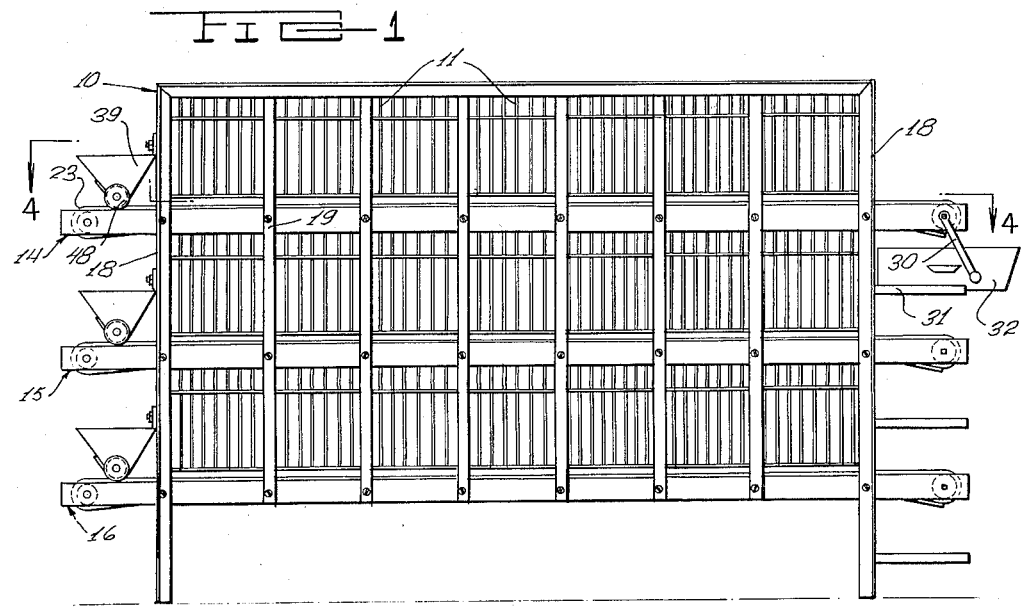
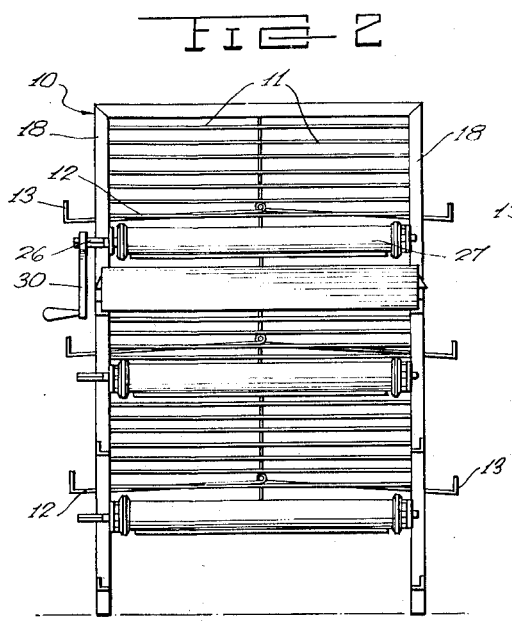
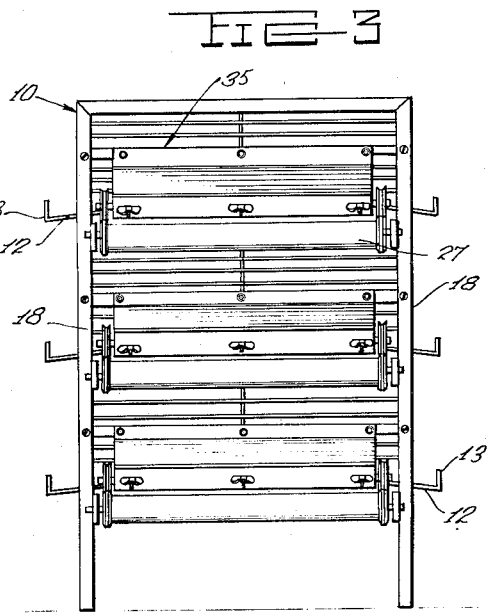
INVENTOR
CHARLES P. F. RATERMANN
BY
McMorrow, Berman & Davidson
ATTORNEYS Aug. 28, 1951     C. P. F. RATERMANN     2,565,521

CLEANING APPARATUS FOR POULTRY LAYING BATTERIES

Filed Nov. 18, 1949     2 Sheets-Sheet 2

INVENTOR
CHARLES P. F. RATERMANN

BY
McMorrow, Berman & Davidson
ATTORNEYS

Patented Aug. 28, 1951

2,565,521

UNITED STATES PATENT OFFICE 2,565,521

CLEANING APPARATUS FOR POULTRY LAYING BATTERIES

Charles Paul Francis Ratermann, Hamilton, Mont.

Application November 18, 1949, Serial No. 128,098

1 Claim. (Cl. 119—22)

This invention relates to cleaning apparatus for poultry batteries, and more particularly to an endless conveyor apparatus for removing waste material from below the cages of a poultry battery and discharging such material at one end of the battery.

It is among the objects of the invention to provide improved cleaning apparatus for a poultry laying or other poultry housing battery which includes endless conveyor belts disposed below the various tiers of battery cages to receive droppings from the cages, which belts are movable under manual control to carry such droppings to one end of the battery and discharge them into a suitable receptacle, which apparatus requires movement of the conveyor belts in only one direction and includes means for covering, with absorbent material, portions of the conveyor belts moved under the cages in the corresponding tiers, and which is simple and durable in construction, economical to manufacture, easy to use, and operates without disturbing or exciting the poultry in the battery cages.

Other objects and advantages will become apparent from a consideration of the following description and the appended claim in conjunction with the accompanying drawings wherein:

Figure 1 is a front elevation of a battery of laying cages equipped with cleaning apparatus illustrative of the invention;

Figure 2 is an end elevation of the front end of the battery illustrated in Figure 1;

Figure 3 is an end elevation of the rear end of the battery illustrated in Figure 1;

Figure 4 is a longitudinal cross section on the line 4—4 of Figure 1, certain parts being broken away to better illustrate the construction;

Figure 5 is a longitudinal cross section of a fragmentary portion of the structure illustrated in Figure 4 and is taken on the line 5—5 of Figure 4;

Figure 6 is a longitudinal cross section of a different fragmentary portion of the apparatus illustrated in Figure 4 and is taken on the line 6—6 of Figure 4; and Figure 7 is a transverse cross section of a somewhat modified form of conveyor belt.

With continued reference to the drawings, and particularly to Figures 1, 2 and 3, the battery of cages comprises a rectangular frame, generally indicated at 10, supporting several substantially horizontal tiers of cages with a plurality of cages arranged in side-by-side relationship in each tier.

Each of the cages 11 is of open work construction, preferably being formed of wire grating or wire mesh, and each cage is of a size to comfortably contain a bird, such as a laying hen, and is provided with a bottom 12 of foraminous material, such as a suitable wire mesh.

As illustrated in Figures 2 and 3, each tier of cages contains two rows of cages disposed in back-to-back relationship and opening to the respectively opposite sides of the battery. Each of the cage floors 12 is slightly inclined downwardly from the rear to the front end of the cage and projects somewhat beyond the front end of the cage where it is provided with an upturned stop 13 so that an egg laid on the floor of a cage will roll downwardly along the floor and outside of the cage coming to rest against the particular stop 13.

As such batteries of laying cages are well known and of substantially standard construction, a more detailed description is considered unnecessary for the purposes of the present invention.

In accordance with the present invention, a continuous conveyor cleaning apparatus is mounted in the battery below each tier of cages. As the battery illustrated has three tiers of cages superimposed one upon the other, three cleaning devices will be required to completely equip the battery. As all of the cleaning devices, as generally indicated at 14, 15 and 16 in Figure 1, may be identical in construction, a detailed description of only one such device is considered sufficient for the purposes of the present disclosure and the device 14 has been selected for this purpose.

The cleaning device 14 comprises an elongated, rectangular boxlike structure 17 of hollow construction and formed of a suitable material, such as sheet metal. This boxlike structure 17 is flat in shape, having a length substantially equal to the length of the battery 10, a width substantially equal to the width of the battery and a thickness somewhat less than the distance between the bottoms of the cages of the upper tier and the tops of the cages of the next or intermediate tier of cages in the battery. This structure is secured to the vertical corner posts 18 of the battery frame 10 and to the vertical strips 19 which support the partitions between each two adjacent cages, and provides a horizontally disposed, continuous top wall underlying and spaced from the floors 20 of the upper tier of cages. As explained above, the floors 20 are formed of foraminous material, such as wire mesh or grating, through which droppings from the poultry in the cages may freely pass.

The side walls of the structure 17 are extended at each end of the structure, and a roller 21 is disposed between the extensions at a location spaced from the left-hand end of the battery, as viewed in Figure 1, and supported on an axle 22 journaled at its ends in apertures provided in the extensions 23 of the side walls of the structure 17.

A roller 24, somewhat larger than the roller 21, is disposed between the extensions 25 at the opposite or right-hand end of the battery in a location spaced from the adjacent end of the battery and is supported on a shaft 26 journaled at its opposite ends in apertures provided in the extensions 25 of the side walls of the structure 17.

The rollers 21 and 24 have a length substantially equal to the width of the tiers of cages constituting the battery 10, and an endless conveyor belt 27, having a width substantially equal to the length of the rollers 21 and 24, is trained over the rollers and surrounds the structure 17. The upper part of this belt 27 rests upon the top wall of the box structure 17 at a location spaced somewhat below the floors 20 of the upper tier of cages 11, as is particularly illustrated in Figures 5 and 6.

The axle 26 is extended at, at least one end, and squared, as indicated at 29, to receive a crank 30 by means of which the roller 24 can be manually rotated to move the conveyor belt through the battery from one end to the other thereof below the floors of the adjacent tier of cages.

While a manually operated crank has been illustrated for rotating the roller 24, it is to be understood that this roller may be rotationally driven by other means without in any way exceeding the scope of the invention.

Means providing a supporting shelf 31 project outwardly from the end of the battery 10 below the roller 24 to support a flat receptacle 32 into which material from the conveyor belt 27 may be deposited, and a plate 33 supported by the structure 17 immediately below the lower part of the belt 17 is extended at one end toward the roller 24 and contacts the under surface of the conveyor belt at this end directly below the roller 24 to scrape any material adhering to the belt from the belt into the receptacle 32. If desired, the end of the plate 33 contacting the belt below the roller 24 may be provided with a beveled edge 34 to facilitate the scraping action.

An elongated hopper, generally indicated at 35, is supported by the battery frame 10 immediately above the belt 27 and adjacent the roller 21.

This hopper 35 has a length substantially equal to the width of the belt 27 and comprises two downwardly converging side walls 36 and 37 and two triangular shaped end walls 38 and 39 secured to the side walls at respectively opposite ends of the latter. The side wall 37 adjacent the battery frame is provided with upper extensions 40 which are apertured to receive bolts 41 by means of which the hopper is secured to the battery frame, and the lower edge of the side wall 36 is spaced from the lower edge of the side wall 37 to provide a slot 42 through which material from the hopper 35 may be fed onto the belt 27. A slide plate 43 is adjustably mounted on the side wall 36 of the hopper in position to vary the width of the slot 42 and is secured to the side wall 36 in adjusted position by suitable means, such as the screws 44 and wing nuts 45 threaded onto the screws.

An agitating spindle 46 having angularly spaced apart radial extensions thereon is journaled near its opposite ends in the end walls 38 and 39 and extends through the interior of the hopper adjacent the slot 42 to feed material from the hopper through the slot. Belt pulleys 47 and 48 are secured on the spindle 46 at the respectively opposite ends of the latter and at the outer sides of the corresponding end walls 38 and 39 of the hopper and the belt 27 is provided along its edges with marginal formations which engage in the grooves of the pulleys 47 and 48 and rotate these pulleys and the spindle 46 when the belt 27 is moved by rotation of the roller 24.

In the arrangement illustrated in Figure 7 a cord or rope, as indicated at 49 and 50, is placed along each edge of the belt and the material of the belt is then hemmed over these cords or ropes providing marginal beads along the edges of the belt 27 which engage in the grooves of the pulleys 47 and 48 to rotate the pulleys.

In the arrangement shown in Figure 4, V-belts 51 and 52 are secured to the conveyor belt 27 along the respectively opposite edges of the conveyor belt and engage in the grooves of the pulleys 47 and 48 for the purpose specified above.

With this arrangement, when the roller 24 is rotated in a direction to move the top part of the belt 27 outwardly of the cage at the end of the cage on which the roller 24 is mounted, the portion of the belt 27 disposed below the upper tier of cages will be moved out from under the cages and any material carried thereby will be deposited in a receptacle 32 supported on the shelf structure 31 below the roller 24. As the belt is moved, any material adhering thereto will be scraped off by the scraping edge of the plate 33 so that when the belt passes this scraping edge it will be in a substantially clean condition.

As the belt is moved by rotating the roller 24, in the above indicated direction, it will rotate the belt pulleys 47 and 48 and cause the deposit of suitable absorbent material, such as ground limestone, lime, sawdust or gypsum from the hopper 35 onto the belt 27. The portion of the belt moved under the cages will thus have a layer of absorbent material deposited thereon which layer of material will prevent the droppings from the cages from adhering to the belt.

With this arrangement it is necessary to move the belts in only one direction and the belts can be moved at such intervals as cleaning of the laying batteries may be considered necessary or desirable.

The belts 27 may be formed from a suitable fabric material or from a rubberized fabric material for long wear, if desired, and the rollers 21 and 24 may be formed of wood, metal or other suitable material and may be solid or hollow, as may be desired.

By using a suitable absorbent material, such as ground limestone, in the hopper 35, the fertilizing value of the material removed from the battery by the cleaning apparatus may be so increased that this material can be sold for fertilizer at an attractive price.

The invention may be embodied in other specific forms without departing from the spirit or essential characteristics thereof. The present embodiments are, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

Cleaning means for a row of contiguously arranged poultry cages provided with floors of foraminous material comprising an elongated rectangular structure disposed below the row of cages and having a flat surface spaced below the cage floors, a roller journaled at each end of said rectangular structure and spaced outwardly from the adjacent end of the row of cages, each of said rollers having a length substantially equal to the width of the cage row, an endless conveyor belt trained over said rollers and surrounding the associated rectangular structure, means connected to one of said rollers to rotate said roller and move the upper part of said belt below the adjacent cage floors in a direction from one end to the other of the row of cages, means supporting a receptacle below the roller at one end of said rectangular structure, and a hopper supported above said belt adjacent the roller at the other end of said structure for spreading absorbent material on said belt as the belt is moved beneath said cages, said hopper having an agitating spindle extending therethrough, a belt pulley secured on said spindle to rotate the latter, and a formation on said conveyor belt engaging said belt pulley to rotate the latter when said conveyor belt is moved.

CHARLES P. F. RATERMANN.

REFERENCES CITED

The following references are of record in the file of this patent:

UNITED STATES PATENTS

| Number | Name | Date |
|---|---|---|
| 1,125,597 | Roegner | Jan. 19, 1915 |
| 1,709,136 | Lockwood | Apr. 16, 1929 |
| 1,876,371 | Westlund | Sept. 6, 1932 |
| 2,068,566 | Olson et al. | Jan. 19, 1937 |
| 2,186,009 | Clark et al. | Jan. 9, 1940 |
| 2,275,009 | Danker | Mar. 3, 1942 |
| 2,309,458 | Ingraham | Jan. 26, 1943 |

FOREIGN PATENTS

| Number | Country | Date |
|---|---|---|
| 209,832 | Great Britain | Jan. 18, 1924 |
| 696,443 | France | Apr. 29, 1930 |